March 13, 1934.　　　　　A. SIMONS　　　　　1,951,174

PROCESS OF MAKING DIES, TOOLS, ETC

Filed Dec. 1, 1932　　　3 Sheets-Sheet 1

INVENTOR
Aaron Simons
BY
ATTORNEYS

March 13, 1934. A. SIMONS 1,951,174

PROCESS OF MAKING DIES, TOOLS, ETC

Filed Dec. 1, 1932 3 Sheets-Sheet 2

INVENTOR
Aaron Simons
BY
ATTORNEYS

March 13, 1934.  A. SIMONS  1,951,174
PROCESS OF MAKING DIES, TOOLS, ETC
Filed Dec. 1, 1932  3 Sheets-Sheet 3

INVENTOR
Aaron Simons
BY
ATTORNEYS

Patented Mar. 13, 1934

1,951,174

UNITED STATES PATENT OFFICE 1,951,174

PROCESS OF MAKING DIES, TOOLS, ETC.

Aaron Simons, New York, N. Y.

Application December 1, 1932, Serial No. 645,260

7 Claims. (Cl. 76—101)

The process hitherto used for manufacturing cutting tools, drawing dies, mandrels and the like including wear resistant or abrasive material, is a long and expensive one. For instance, in one such process a finely divided powder including tungsten carbide and a binding agent such as cobalt, is compressed into compact form by the application of pressure. No substantial friction or heat is developed through the application of this pressure. The pressure is then removed and the compact mass is placed in a special furnace in an atmosphere of reducing gas such as hydrogen, and sintered at a temperature of about 1200° F. It is then machined or cut to the proper shape and again placed in a temperature of hydrogen for about ninety hours and then permitted to slowly cool. Such a method entails the expenditure of a great deal of time and expense.

Furthermore, the product so formed is not entirely satisfactory in view of the unevenness of cooling and the formation of minute holes and pores. Also, in this process, the mass is heated to a temperature only sufficient to melt the binding agent, the melting temperature of the tungsten carbide particles being much higher than that of the binding agent so that the tungsten carbide particles are merely brazed together. Furthermore, during the time the mass is being heated to a brazing temperature, no pressure is applied so that the particles are not firmly pressed together. The tensile strength of the product so formed depends a great deal on the strength of the binder.

Dies and tools made from tungsten carbide are highly desirable because they present a very hard wearing surface. However, they are very brittle, have very little tensile strength, and are easily broken. Tungsten carbide bodies are very expensive, and after breakage or wear beyond a certain limit, are usually thrown away since they cannot be resintered.

One object of the present invention is to provide a process for making an abrasive or refractory body which can be manufactured inexpensively and in a comparatively short time.

Another object of the present invention is to recreate bodies from scrap abrasive material by a comparatively inexpensive process.

In following my improved process abrasive or refractory material is reduced to a very fine powder, preferably preheated to a temperature below the melting point of the abrasive material, and then subjected to a powerful and high velocity blow, which causes the mass of particles to be instantaneously compressed and the particles relatively moved at high velocity. The particles of abrasive material are very hard and inelastic so that sufficiently high friction is created between the particles to heat them to a welding temperature at least on their surfaces. The friction is created either between adjacent particles or between the particles and adjacent particles or parts of any other material present. The sudden compression of the finely divided mass not only produces the high temperature, but causes the highly heated particles to be forged into a solid mass.

The product, such as tungsten carbide, so formed, has greater tensile strength than the sintered product since the particles of tungsten carbide are welded and forged together, and the tensile strength does not depend primarily upon the bond effected between the particles by any binder. Furthermore, the particles are so consolidated and forged together under heat and the pressure effect of the powerful and high velocity blow, as to eliminate pores usually existent in the sintered product. The percussive impact or blow to which the particles are subjected causes better consolidation thereof into a solid mass and forms a tough, hard, wear resisting body.

Inasmuch as the energy imparted to the particles depends on the square of velocity of the percussive body, and since a great deal of this energy is converted into heat, it is seen that the quicker the blow, the greater the heat produced in the finely divided mass. The powerful and high velocity blow not only serves to raise the temperature of the particles to a welding heat on their surfaces, but also presses the particles together so that they are effectively welded into a solid mass. Also, since the high welding heat is created by friction in the interior of the finely divided mass, a more uniform distribution of heat in this mass is effected. This is not true in bodies or masses heated by external application of heat.

Although the process is particularly advantageous in forming tungsten carbide bodies, it may be used for forming bodies from other abrasive or wear resisting materials which may be readily reduced to finely divided form and welded together. By means of the present process, those abrasive, hard, wear resisting bodies such as those of tungsten carbide, which have been worn or broken through use, may be recreated to form a product which is an improvement over the original product. The tungsten carbide scrap which may be used may be of the type which is substantially uniform and consists of pure tungsten carbide, or may comprise the sintered or brazed product, in which case a binder is present.

If the finely divided mass contains a binder, then the pressure to be produced may be lower than that required where the mass consists of pure abrasive material, and need only be sufficient to effect the welding of the particles of the binding agent together. The blow may be sufficient to melt the entire mass of the binder and to melt the surfaces of the abrasive particles so as to form a more effective bond between the binder and the abrasive particles. In any case where scrap material is used, no addition of binder is necessary.

Abrasive bodies such as tungsten carbide, are usually mounted in metal holders which furnish the required tensile strength to withstand operating stresses.

As another feature of the present invention, the process of creating or recreating the abrasive body also welds said body to a holder or casing. In carrying out this feature of my invention, the abrasive material in finely divided form is entirely enclosed in a metal casing to seal it against oxidation, and the assembly heated to a temperature near to but below the melting point of the casing.

The assembly is then subjected to a sudden and extremely powerful impact or blow. The temperature created in the finely divided mass by this impact is sufficient to melt the particles thereof at least on their surfaces and is localized in the mass. The powerful and high velocity blow also forges them together into a solid mass and welds the casing on to the body of abrasive material.

The casing which serves to hold the body of abrasive material has a greater coefficient of expansion and contraction than the abrasive material, so that when it is cooled, said casing tends to compress the body of abrasive material and holds it against tensile operating stresses.

Tungsten carbide dies or other similar dies often break as a result of the outward disruptive forces to which they are subjected during the drawing of the wire or tube therethrough. An article made in accordance with the present invention serves to more effectively counteract the outward disruptive forces since the hard operating body is tough, and the outside casing formed integral therewith holds said body under compression. Also the abrasive or wear resistant body itself is denser, tougher and more uniform in character.

By means of the present invention, there is formed a new article of manufacture comprising a holder or supporting member such as tool steel, and having welded either on the inside or outside thereof a hard, tough body of abrasive particles welded and forged together into a solid mass.

In the accompanying drawings, there are shown for the purpose of illustration, certain ways of carrying out the present invention. In these drawings.

In carrying out my improved process, suitable abrasive or wear resisting material in finely divided loose form is utilized to form an abrasive or wear resistant surface directly on a suitable metallic holder or support. This abrasive material may be silicon carbide, flint, quartz, tungsten carbide or the like, and if desired may be mixed with a suitable portion of metal binder sufficient to fill up the voids between the abrasive particles. The use of such metallic binder is not necessary since sufficient heat is generated by my improved process to effect welding between the particles of abrasive material themselves.

I prefer to use scrap material such as broken or worn out parts of tungsten carbide from dies, tools, and the like, and form it into a body having greater wear resisting properties and tougher than the original stock. If the scrap, wear resisting or refractory body to be used was encased in a holder, the latter may be removed by a lathe or shaper until there is only a very thin layer left on the surface of said body and this may be eaten away with acid.

The abrasive or wear resisting material is reduced to a very fine powder preferably of sufficient fineness to pass through a 200 to 400 wire mesh screen. This may be done in a ball mill or by any other suitable apparatus. To this powder may be added, if desired, a binder also in fine powder form.

In using scrap tungsten carbide or other abrasive material, I do not need any other binder. If the scrap abrasive body has a binder already therein, this will again serve its function in carrying out my process. If material free from a binder is used, and it is desired to use a binder, I may add a hard, tough material such as chrome nickel alloy.

In the process exemplified in Figs. 1 to 4, the finely divided mass 10 which includes the abrasive or wear resisting material in loose form, is placed in a holder 11 forming part of a metal casing, and a close fitting metal cover or top 12 is inserted on top of said mass to seal the latter from contact with the atmosphere, so as to avoid oxidation of said mass during heating and the application of the powerful and high velocity blow. The casing may be of any suitable metal such as tool steel, and have a fusion point much lower than that of the abrasive or wear resisting material, and a coefficient of expansion higher than that of said material. The casing provides a chamber considerably larger than the size of the desired body of the wear resisting material to be formed, and as shown the upper portion of the side wall of the holder 11 is of lesser thickness than the lower portion to permit the forging and reduction of size of the chamber.

Figure 1:
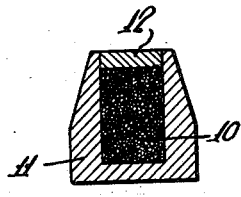
Fig. 1 is a section through a holder filled with the powdered material prior to being subjected to a powerful and instantaneous impact, the particle sizes being very greatly magnified.

The assembly shown in Fig. 1 is then heated to near the welding temperature of the casing, which, in the case of tool steel, would be about 1200° F. to 1800° F. This need not be in a nonoxidizing atmosphere, since the mass 10 is sealed and air is excluded from contact therewith, and may be in an open hearth furnace. The heated assembly is then placed in a forge or die block 13 having an opening 14 of a size equal to that of the forging desired to be formed, but just slightly larger than the casing before being subjected to a sudden blow. A very powerful and high velocity blow is then applied to the top of the casing by means of a hammer or plunger 15, which causes the finely divided particles of the mass 10 to move relatively in frictional engagement and to greatly reduce the size of the chamber occupied by the mass. This raises the temperature of the particles to a welding heat and causes the particles to be welded together into a solid mass 10a. If a binder is used, said binder will be fused on to the particles of abrasive material. The blow of the plunger 15 causes the metal of the thinner tapered wall of the casing to flow downwardly from the upper end of said casing, and the reduction in length causes a thickening of the walls of said casing and the exertion of pressure on the sides of the mass 10 so that the finely divided mass is compressed on all sides as shown in Fig. 3.

Since the blow is a sudden and powerful one, the velocity with which these particles pass or rub against each other causes the temperature to rise. The blow must be made sufficient to bring the temperature high enough to cause the particles to weld together. If the mass consists of pure abrasive or wear resisting material, the temperature necessary must be higher than is the case where a binder having a lower melting point is used. In any case, the temperature produced by means of this operation is sufficient to cause fusion of the particles at least on their surfaces.

Figure 2:
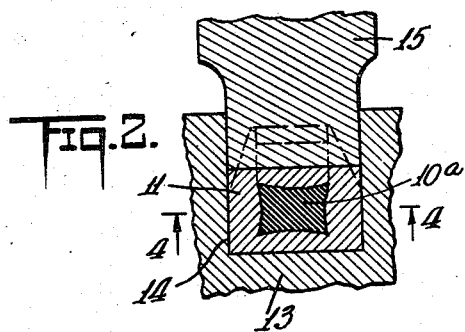
Fig. 2 shows the assembly of Fig. 1 in a forge block or die after the application of the powerful and instantaneously applied blow.
Figure 4:
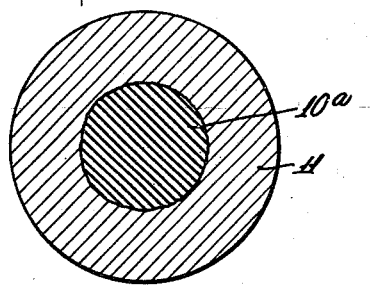
Fig. 4 is a section through the forging on line 4—4 of Fig. 2.
Figure 3:
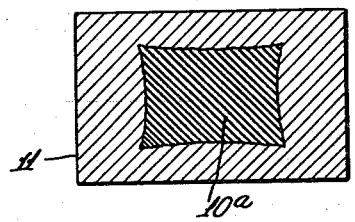
Fig. 3 is a section through the forged product formed by the operation exemplified in Fig. 2, but on a larger scale.

The application of a powerful and high velocity blow also causes the holder 11 to be welded on to the solid mass 10a of abrasive material formed, and also causes the welding of the cover 12 and to the abrasive material to form a forging as shown in Figs. 2 to 4. Although the forging shown in Fig. 4 is of cylindrical cross-section, this is not essential. The forging shown in Fig. 4 may be finished to form a wire drawing die.

The material from which the casing or holder 11 is made has a coefficient of expansion greater than that of the abrasive material so that upon cooling, the abrasive body is held under compression. This serves to effectively counteract any tension to which the abrasive body may be subjected.

Figure 5:
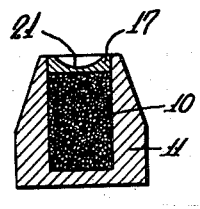
Fig. 5 is a section similar to Fig. 1 but showing a slightly different form of holder.
Figure 6:
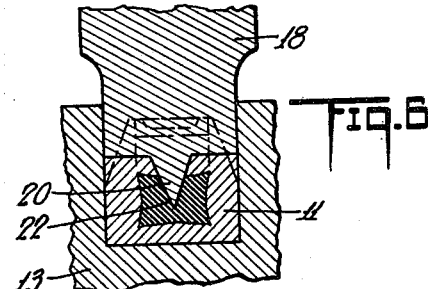
Fig. 6 is a section similar to Fig. 2, but showing a different form of impact member.
Figure 7:
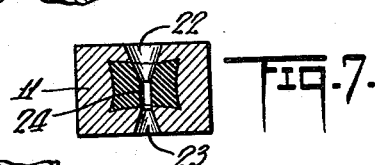
Fig. 7 shows a wire drawing die formed from the forging shown in Fig. 6.

In Figs. 5, 6 and 7 is shown another form of holder for forming a wire drawing die. The cover 17 in this case is made thinner with a recess 21, and the hammer 18 is provided with a pointed tip 20 so shaped as to split the upper portion of the mass 10 at the instant of the blow to form a tapered cavity in the upper portion thereof.

The hammer or impact member 18 is operated to give a sudden and powerful blow to the top of the assembly as shown in Fig. 6. This causes the tip 20 to pierce through the thin portion of the cover 17 and partially through the mass 10, and to compress the mass on opposite sides of the tip 20. The heat and pressure produced by the blow causes the finely divided particles to be forged together into a solid mass and also causes the metal of the holder 11 and cover 17 to flow so that the walls of the casing are thickened and pressure transmitted to the finely divided particles in all directions. This forms a forging, as shown in Fig. 6, having a V-shaped cavity 22 at one end thereof. In the ordinary type of die, the opposite ends of the opening through which the wire passes, are flared to facilitate the insertion of a wire therein, and the intermediate portion is drilled to a size in accordance with the wire drawing diameter desired. The piercing of the abrasive body serves to form one flared end of the opening of the die and reduces the amount of material to be used and the amount to be removed in finishing the die. It also serves to more effectively compress the material during the application of the blow.

In Fig. 7 is shown the final form of the wire drawing die provided at one end with the flared opening 22 produced by the tip 20, a flared opening 23 formed by machining, and an intermediate hole 24 which is drilled and which forms the operating or wear resisting surface of the die.

Figure 8:
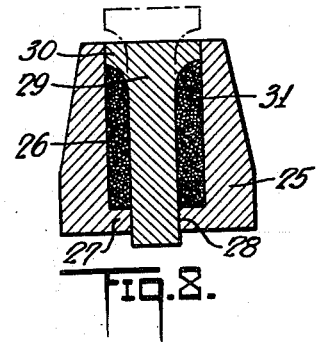
Fig. 8 is a section similar to Figs. 1 and 5, but with a different form of holder or casing.
Figures 9, 10:
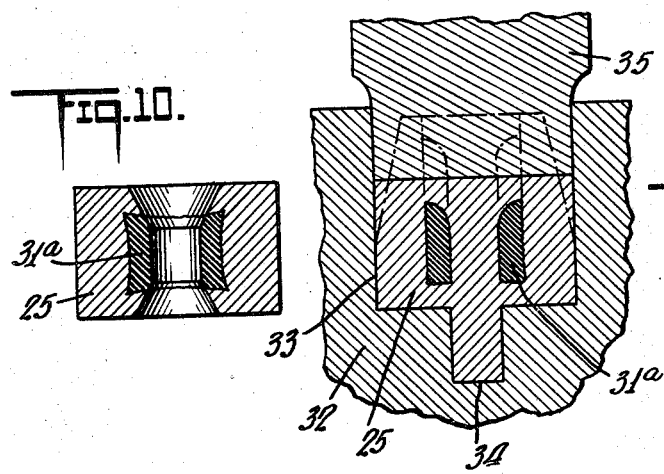
Fig. 9 is a section similar to Figs. 2 and 6, but with an impact tool and holder suitable for the treatment of the form shown in Fig. 8.
Fig. 10 shows a wire drawing die formed from the forging made by the process exemplified in Figs. 8 and 9.

In Figs. 8, 9 and 10 is shown another form of casing or holder from which a wire drawing die may be formed. Here the forging is formed with the body of abrasive material in the form of an annular ring, so that final machining and drilling operations are facilitated. In this form of my invention, there is provided a casing including a holder 25 having a chamber 26 and an inwardly turned flange or bottom 27 at one end forming an opening 28.

Passing through the center of the holder 25 is a core member 29 having the main portion of the same size as the opening 28 and having at the upper end thereof an outwardly extending flange 30 of the same size as the width of the chamber 26 at its upper end. This core member 29 may be of any suitable material such as graphite or of the same metal as the casing as shown. The space between the core member 29 and the holder 25 is filled with a finely divided mass of abrasive material 31 in any suitable manner, for instance by moving the core member 29 into the position shown in dotted lines, so that the lower end of said member closes the opening 28 and the flange 30 is spaced from the upper end of the holder 25. The loose powdered material is then poured through the space between the flange 30 and the top of the holder 25 and the core member 29 is then lowered into the position shown in full lines. The flange 30 may be in the form of a cover separate from the core member. The assembly shown in Fig. 8 is preheated as above described and is placed in a die block 32 having a recess 33 to receive said assembly and a cavity 34 at the bottom of said recess. A hammer 35 is then caused to give the assembly a sudden and powerful blow which forces the core member 29 into the cavity 34 and causes the material of the casing to spread out to form a forging as shown in Fig. 9, with the particles of the material 31 consolidated into a solid mass 31a and the casing welded thereto. The forging may then be finished as shown in Fig. 10 to form a wire drawing die. In this form, I eliminate a large portion of the wastage of abrasive material resulting from drilling and forming an operating surface, and also facilitate finishing of the forging into the form shown in Fig. 10 since the core member 29 can be easily cut out.

Figure 11:
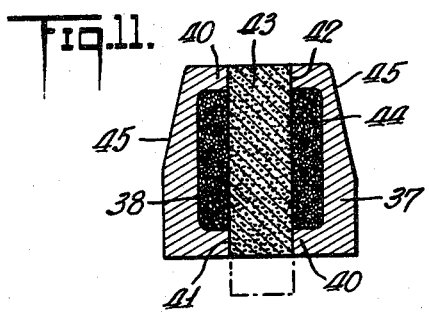
Fig. 11 is a section similar to Figs. 1, 5 and 8, showing a different form of holder or casing.
Figure 12:
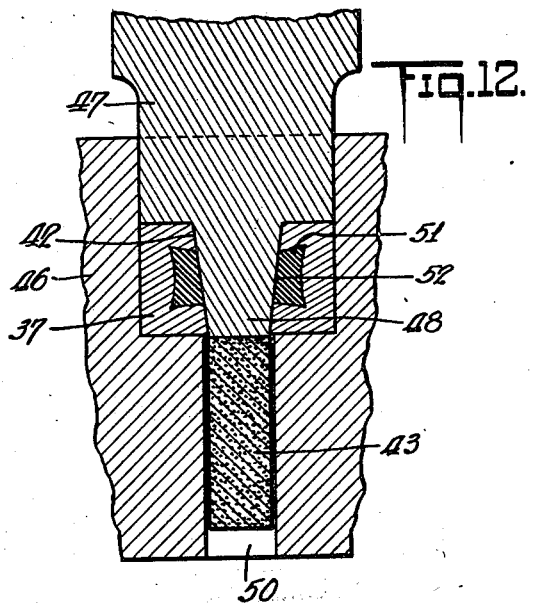
Fig. 12 is a section similar to Figs. 2, 6 and 9 but with the impact tool and support designed for the construction shown in Fig. 11.

Figs. 11 and 12 show another form of casing from which a wire drawing die may be formed. In this construction, a forging is formed having an annular ring of wear resisting material, and an opening through the center of said forging, so that the finishing operation of removing the portion of the casing in the interior of the abrasive ring is eliminated. In this form, there is provided a casing 37 having an opening 38 and inwardly extending flanges 40 at both ends thereof forming reduced openings 41 and 42. Passing through the center of the casing 37 is a core member 43 which is of any suitable material such as graphite, and of substantially the height of the casing 37 and of a cross-section corresponding to that of the openings 41 and 42. The annular space between the core member 43 and the casing 37 is filled with a finely divided mass 44 of wear resisting material. This may be filled in to the annular space by lowering the core member 43 into the position shown in dotted lines, so that the upper end thereof is spaced below the lower face of the top flange 40. The loose, finely divided mass 44 may then be poured in through the space formed.

After the annular space has been filled with the finely divided mass, the core member 43 is positioned as shown in full lines. The casing 37 is provided with sloping sides 45 to permit the increase in the thickness of the casing walls during the forging operation.

Figure 13:
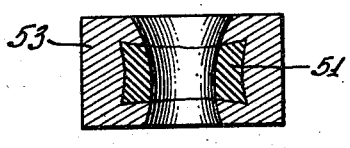
Fig. 13 shows a wire drawing die formed from the forging made by the process exemplified in Figs. 11 and 12.

The assembly shown in Fig. 11, after being preheated, is then placed in a forge block 46 as shown in Fig. 12, and subjected to a powerful and high velocity blow by means of a hammer 47. This hammer 47 is provided at its operating end with a projection 48 having the sides thereof converging towards the free end and having said free end slightly smaller than the opening 42. As the assembly is subjected to the powerful and instantaneous action of the hammer 47, the projection 48 passes through the opening 42 and in extruding the core 43 forces its way through the assembly. The forge block 46 is provided with an opening 50 to receive the extruded core member 43 during this operation. By means of this operation, the mass 44 is acted upon by the material of the casing and the outward internal force of the projection 48 to forge it into the form of an annular ring 51 having an opening 52 therethrough. The forging so formed may then be finished to form a wire drawing die 53 as shown in Fig. 13.

Figure 14:
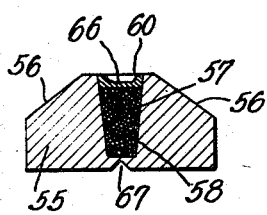
Fig. 14 is a section similar to Figs. 1, 5, 8 and 11, but showing a different form of holder or casing.
Figure 15:
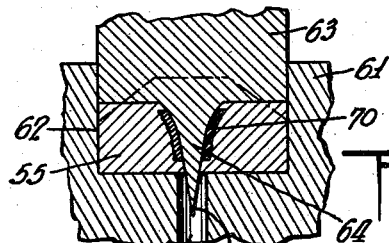
Fig. 15 is a section similar to Figs. 2, 6, 9 and 12, but with the impact tool and support designed for the construction shown in Fig. 14.

In Figs. 14 and 15, the forging is so formed as to provide an operating surface in the form of a thin layer of the hard, wear resisting material. Inasmuch as the hard operating material used for wire drawing or other analogous operations is expensive, and since the utility of this material in certain cases ceases when it becomes worn even to a slight degree, a saving is effected by making the layer comparatively thin. For instance, in a wire drawing die, a high degree of accuracy is required in the size of the drawn wire. When the operating surface has been worn beyond the tolerance limit, these dies or tools must be recut to draw a larger wire, or are scrapped, and a large portion of the wear resisting material such as tungsten carbide is wasted. In this form of my invention, the amount of finishing required after the forging is formed is materially reduced, this finishing operation being merely sufficient to polish the operating surface.

In Fig. 14 is shown a metal casing which includes a mold or holder 55 having sloping sides 56 and a cavity 57 flared towards the outer end thereof. This cavity 57 is filled with a mass 58 of the loose, finely divided material used to form the wear resisting surface, and is sealed by a close fitting metal cover or top 60.

The assembly shown in Fig. 14, after being preheated, is placed in a forge block 61 having an opening 62 and is then subjected to a powerful and high velocity blow by means of a hammer 63 having a projection 64 at the lower end thereof. This projection 64 has a sharp point 65 and at the moment it strikes the assembly shown in Fig. 14, it pierces the cover 60 and the lower portion of the mold 55. In order to facilitate the piercing of these members, the intermediate section of the cover 60 is weakened by a cavity or recess 66, and the lower end of the holder 55 beneath the mass of abrasive material 57 is provided with a recess 67.

The projection 64 has a curved surface which conforms with the surface of the finished wire drawing die to be formed. The base of the block opening 62 is provided with an opening 68 to receive the lower end of this projection 64.

The forging formed includes a holder having a thin annular ring 70 of abrasive material welded thereto, the inner operating surface of this ring being substantially the shape of the wire drawing die to be formed. The inner surface may then be finished by any suitable means.

Figure 16:
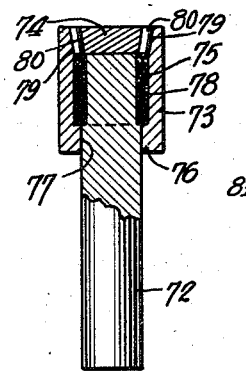
Fig. 16 is a section similar to Figs. 1, 5, 8, 11 and 14, but showing a form for forging the wear resisting material on the outer surface of the holder.
Figure 17:
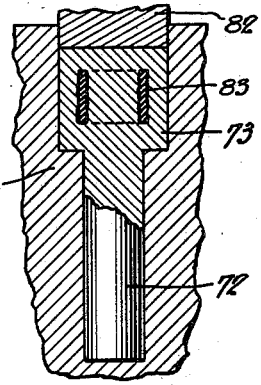
Fig. 17 shows the assembly of Fig. 16 after forging.
Figure 18:
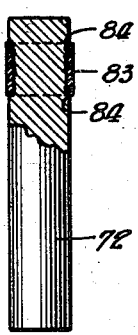
Fig. 18 is a view, partly in section, of a tube drawing mandrel formed in accordance with the process exemplified in Figs. 16 and 17.

In Figs. 16, 17 and 18 is illustrated a different form of holder whereby there is produced a tool having a thin layer of hard, tough, wear resisting material forged and welded on to the outside of the holder. Such a tool may be as a mandrel in the manufacture of tubes. In this embodiment of the invention, a mandrel rod 72 has one end thereof provided with an annular peripheral groove and is enclosed into a casing comprising a sleeve 73 having a chamber of such diameter as to form an annular space 75 having an outside diameter slightly greater than the diameter of said rod. The inner end of the sleeve 73 is provided with a radially inwardly extending flange 76 forming an opening 77 which is substantially the size of the main portion of the mandrel rod 72. A cover 74 fits closely at the other end of the sleeve 73.

The annular space 75 is filled with a mass 78 of loose, finely divided wear resistant or abrasive material. The cover may be integral with the rod and holes 79 may extend into the space 75. After the space 75 has been filled, suitable plugs 80 may be inserted in the holes 79.

The assembly as shown in Fig. 16, after being preheated, is placed in a forge block 81, and subjected to a powerful and high velocity blow by means of a hammer 82 so as to form a forging having an enlarged end in which is embedded and welded a thin annular ring 83 of hard, tough material as shown in Fig. 17, with the diameter of the outer surface of this ring slightly larger than the diameter of the mandrel rod 72. The enlarged end of the mandrel may then be finished as shown in Fig. 18 by cutting away the casing so as to expose the outer surface of the ring 83, and to present an operating surface for the tube drawing mandrel. The ring as shown in Fig. 18, has the ends thereof held between shoulders 84 formed in the mandrel rod 72. Furthermore, since the ring 83 is welded to the mandrel, said ring is firmly held against displacement during tube drawing operations.

In Figs. 19 to 22 is illustrated a process for forming a cutting or turning tool, which comprises a supporting member made of suitable material such as tool steel, and having an operating or cutting portion formed from a thin layer of hard, tough abrasive material welded thereto. There is provided a holder in the form of a metal bar 86 having near one end thereof a comparatively long and shallow cavity 87. This cavity 87 is filled with loose, finely divided abrasive material 88 of the type already described, and a close fitting metal cover or top 89 is inserted in the cavity on top of said material 88 to seal it against contact with the atmosphere.

Figure 20:
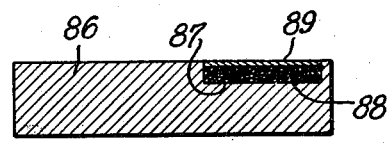
Fig. 20 is a section taken on the line 20—20 of Fig. 19.
Figure 22:
Fig. 22 is a longitudinal section of the tool shown in Fig. 21.
Figure 19:
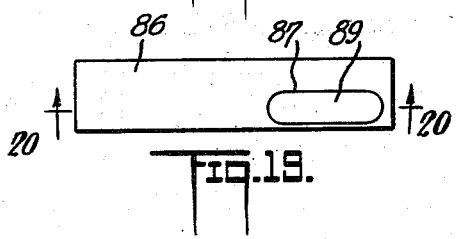
Fig. 19 is a top plan view of another form ready for forging.
Figure 21:
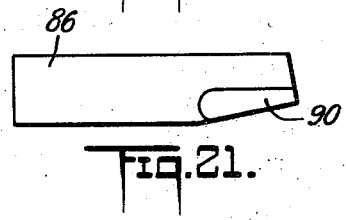
Fig. 21 is a plan view of the tool made by the form shown in Figs. 19 and 20.

The assembly shown in Figs. 19 and 20, after being preheated, is subjected to a powerful and instantaneous blow in a forge block in a manner similar to that already described so that the cover 89 becomes welded on to the bar 86, the particles of finely divided material 88 welded together to form a tough, hard, thin layer 90, and this layer welded on to the bar 86 and to said cover 89. The surfaces of the bar 86 adjacent the layer 90 are then cut away to expose the end and the surface of said layer as shown in Fig. 22. The end of the bar 86 may then be bevelled as shown in Fig. 21 to form a cutting edge.

Figure 23:
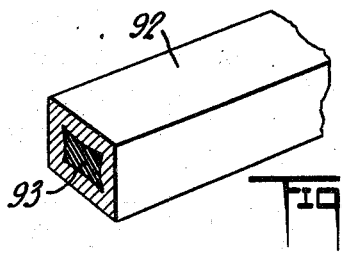
Fig. 23 shows a perspective of another form which may be forged by my process.

For making a grinding tool, the abrasive material may be placed in a tube of cylindrical, rectangular or other form, and subjected to the blow which causes the internal heat, the compacting and the welding. In Fig. 23, I have shown such a tool including a casing holder or shell 92 and a core 93 of the abrasive material.

The product and the articles made therefrom and disclosed herein, are claimed in my copending divisional application, Ser. No. 711,341, filed February 15, 1934.

Having thus described my invention, what I claim as new and desire to secure by Letters Patent is:—

1. The process which includes the steps of breaking metallic wear resisting material into a finely divided mass, enclosing the mass in a metal casing having a fusion temperature below that of the abrasive material and a co-efficient of expansion higher than that of the mass, subjecting the assembly so formed to a preliminary heating near to but below the melting temperature of the casing, and then subjecting the assembly to a powerful high velocity blow to compress said mass, cause relative movement between the particles thereof at high velocity, and create friction between the particles of the mass sufficient to raise their temperature to a welding heat to consolidate them into a solid mass and weld them to the casing.

2. The process which includes the steps of breaking scrap containing tungsten carbide into a finely divided mass, enclosing the mass in a metal casing having a fusion temperature below that of the tungsten carbide, and a coefficient of expansion higher than that of the mass, subjecting the assembly so formed to preliminary heating near to but below the melting temperature of the casing, and then subjecting the assembly to a powerful high velocity blow to compact said mass and cause relative movement between the particles thereof at high velocity, and to cause sufficient friction between the particles of the mass to raise their temperature to a welding heat, whereby they are consolidated under the forging action of the blow into a solid mass, and the enclosing metal welded to said mass.

3. The process which includes the steps of forming a finely divided mass of metallic abrasive material, placing it in a metal casing to entirely enclose said mass and protect it from oxidation, said casing having a fusion temperature below that of the abrasive material, heating the assembly to a temperature below the melting temperature of the casing, placing the heated assembly in a die having a block to receive said casing, striking said assembly with an impact member having a tip of conical cross-section to impart a powerful high velocity blow, and to cause the piercing of the tip through said casing and partially through said mass to raise the temperature of said mass sufficiently to weld the particles thereof together into a solid mass and to weld the consolidated mass to said casing, thereby forming a forging having a recess at one end thereof in accordance with the shape of said tip.

4. The process which includes the steps of forming a finely divided mass of metallic wear resisting material, entirely enclosing said mass in the form of an annulus in a casing having a metallic part surrounding said annulus and having a fusion temperature below that of the material, subjecting the assembly to preliminary heating below the melting temperature of the metal portion of the casing, subjecting the assembly to a sudden and powerful blow to cause relative movement between the particles of the mass at high velocity and thereby raise the temperature thereof sufficiently to weld the particles together into a solid mass and to weld said mass to said casing, and finishing the forging so formed to make a wire drawing die.

5. The process which includes the steps of forming a finely divided mass of abrasive material, placing said mass around a core member and in a metal mold so that said mass is retained in said mold in the shape of an annular ring and is protected from oxidation, subjecting the assembly so formed to a preliminary heating near to but below the melting temperature of the mold, and subjecting the assembly to a sudden and powerful blow at one end of said mold and in the central portion of said mass to extrude said core member, to simultaneously cause relative movement of the particles of the mass at high velocity and the development of friction between said particles to thereby raise the temperature thereof to a welding heat, and to weld the particles thereof together under pressure to form a tough, hard annular ring.

6. The process which includes the steps of encircling a metal rod with an annular finely divided mass of abrasive material and enclosing said mass to seal it against contact with the atmosphere, subjecting the assembly formed to preliminary heating near to but below the melting temperature of the metal portion of the rod, subjecting the assembly to a sudden and powerful blow to cause relative movement between the particles of the mass at high velocity, to raise the temperature thereof sufficiently to weld the particles together into a solid mass, and to weld said mass to said rod, and finishing the forging formed to make a tube drawing mandrel having an annular thin layer of tough, hard, abrasive material welded on the outside of said rod and presenting an operating surface.

7. The process which includes the steps of enclosing a mass of finely subdivided abrasive material in a metal casing having a fusion temperature below that of the abrasive material and a coefficient of expansion higher than that of the mass, subjecting the assembly so formed to a preliminary heating near to but below the melting temperature of the casing, and then subjecting the assembly to a powerful high velocity blow to compress said mass, to cause relative movement between the particles thereof at high velocity, and create friction between the particles of the mass sufficient to raise their temperature to a welding heat to consolidate them into a solid mass and weld them to the casing.

AARON SIMONS.